United States Patent [19]

Smith

[11] Patent Number: 4,857,210

[45] Date of Patent: * Aug. 15, 1989

[54] METHOD AND APPARATUS FOR PREVENTION OF BLINDING OF CENTRIFUGE FILTER SCREENS

[75] Inventor: Lloyd B. Smith, Bristol, Tenn.

[73] Assignee: The United Company, Bristol, Va.

[*] Notice: The portion of the term of this patent subsequent to Feb. 3, 2004 has been disclaimed.

[21] Appl. No.: 178,659

[22] Filed: Apr. 7, 1988

[51] Int. Cl.$^4$ ............... B01D 21/26; B01D 33/02; B04B 1/06

[52] U.S. Cl. ............... 210/781; 210/377; 210/380.3; 494/36; 494/37

[58] Field of Search ........... 210/781, 782, 377, 380.1, 210/380.3, 360.1; 494/36, 37, 56; 34/8, 58

[56] References Cited

U.S. PATENT DOCUMENTS

| | | | |
|---|---|---|---|
| 1,847,159 | 3/1932 | Adams | 210/380.1 |
| 3,040,893 | 6/1962 | Schmiedel | 210/377 |
| 4,639,320 | 1/1987 | Smith | 210/781 |
| 4,640,770 | 2/1987 | Smith | 210/360.1 |

FOREIGN PATENT DOCUMENTS

| | | | |
|---|---|---|---|
| 371239 | 3/1907 | France | 210/377 |
| 1037141 | 9/1953 | France | 210/380.1 |

Primary Examiner—W. Gary Jones
Attorney, Agent, or Firm—Jennings, Carter, Thompson & Veal

[57] ABSTRACT

A non-blinding filter system for batch centrifuges utilizes a high speed injection nozzle to input wet particulate matter in the form of a slurry into a batch centrifuge in a manner that maintains turbulence within the slurry during the filling operation. Submicron particulate fines are suspended in the filtrate and settle out less rapidly than larger diameter particulate matter, thus a layer of coarser material can be laid over the filter media before the majority of the filtrate passes therethrough. A plurality of metering orifices retard the extraction of the filtrate such that the submicron particles are not forced through the layer of coarser material to the filter media with blinding consequences.

11 Claims, 2 Drawing Sheets

METHOD AND APPARATUS FOR PREVENTION OF BLINDING OF CENTRIFUGE FILTER SCREENS

FIELD OF THE INVENTION

The present invention relates to drying wet particulate matter in a centrifuge and more particularly to the prevention of premature blinding of filter screens in such centrifuges. In even greater particularity the present invention relates to the introduction of particulate matter in slurry form to a centrifuge and the controlled withdrawal of filtrate therefrom.

BACKGROUND OF THE INVENTION

It is widely accepted in industry that nearly all types of fine particulate filters will blind. As the filtration of fine particulate continues over a number of cycles in a batch type centrifuge or over a period of time in a continuous filter system, the finer particles tend to remain in suspension and move through the coarse particles toward the filter medium. Since the filter medium must be fine enough to stop fine particles so that they will not pass through the filter the suspended fines will build up on the filter medium and blind it.

After blinding, some form of liquid backwash or compressed gas backflow must be used to free the filter media so that filtering can resume. In most applications, it is practical to use such methods of filter cleaning on production systems. However, in the case of batch type centrifuge filters, regular backwashing is not feasible. When finely powdered particulate is being filtered in a conventional batch type centrifuge, the filter will quickly blind and become inoperable.

SUMMARY OF THE INVENTION

It is the object of the present invention to enable the operation of batch typ centrifuges for drying fine particulate at high artificial gravity levels for hundreds of cycles without blinding of the filter screens.

To accomplish this object I utilize a high speed centrifuge such as that described in my earlier U.S. Pat. No. 4,640,770. In such a centrifuge an overhung bowl having an opening at one end is rotated at very high speed via a driven resiliently supported shaft attached to the other end of the bowl. I utilize a slurry feed nozzle system inserted through the open end of the bowl to rapidly and turbulently feed the wet particulate matter into the rotating bowl. My bowl is designed with a plurality of flow metering orifices to restrict the outflow of filtrate from the bowl. The metering orifices are covered by a pervious support and a fine screen filter media of sufficient fineness to allow a bed of particulate matter to form without fine particulate moving through the filter and contaminating the filter. Avoidance of blinding of the filter is accomplished by maintaining turbulence in the slurry until a bed of larger particulate matter is formed proximal the screen filter, such that the majority of the fine particulate matter remains suspended in the slurry until deposited on the bed of particulate matter as an inner layer. The controlled outflow rate prevents migration of the fine particles through the bed to the screen filter.

BRIEF DESCRIPTION OF THE DRAWINGS

Apparatus employing features of my invention are depicted in the accompanying drawing which forms a portion of this disclosure and wherein.

BRIEF DESCRIPTION OF A PREFERRED EMBODIMENT

Figure 1:
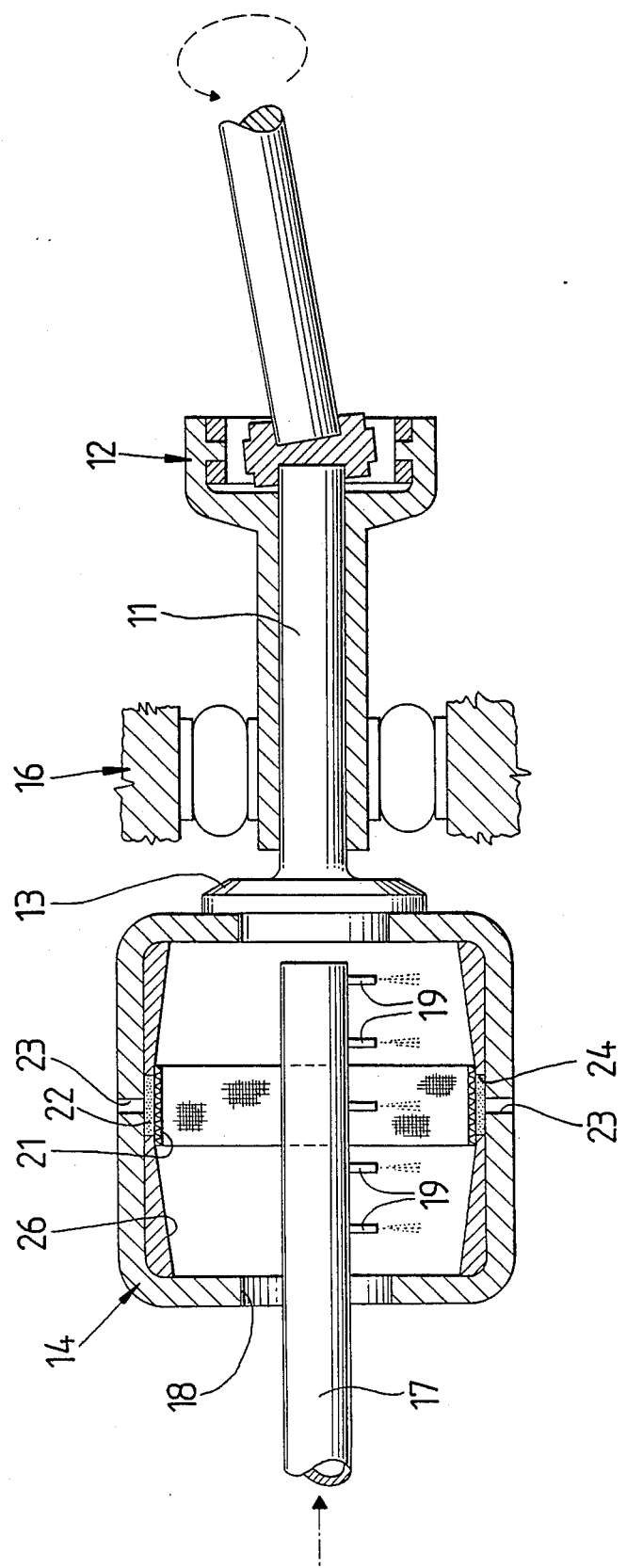
FIG. 1 depicts a centrifuge bowl in section showing the feed nozzle, the filter media and a metering orifice.
Figure 2:
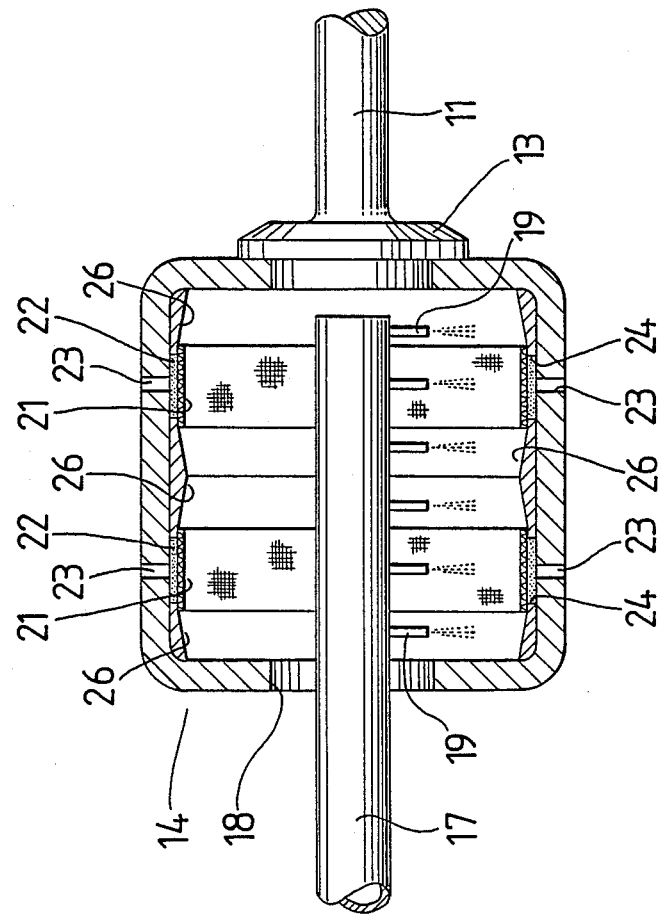
FIG. 2 depicts an embodiment using two filter media.

Referring to the figure for a clearer understanding of the invention, it will be appreciated that the present invention is directly related to the utilization of high gravity centrifuges such as described in my prior U.S. Pat. No. 4,640,770, which is assigned to the assignee of this application. Accordingly the drive mechanism and stabilizing mechanism are such as are more fully described therein where a drive shaft 11 is rotated by a power supply via a gimbal-like connection 12 at one end thereof. A hub 13 attaches the drive shaft 11 to an overhung bowl 14 and the shaft 11 and bowl 14 are supported on a resilient suspension system 16. The bowl 14 is preferentially a lightweight composite material dynamically balanced for rotation about a central axis.

The centrifuge is used to extract liquid or filtrate as it may be called from a slurry of wet particulate matter. The slurry is introduced to the bowl 11 through a nozzle assembly 17 inserted through an opening 18 in the bowl. The nozzle assembly 17 extends axially within the bowl 14 and has a plurality of injector ports 19 which direct the slurry radially into the bowl 14. By way of example a plurality of ¾ inch diameter injector ports can inject slurry at a rate of 120 gallons per minute with a injection velocity of 17.5 feet per second. As may be seen such injection into a bowl 14 having a 28 inch diameter being rotated at 1500 RPM creates substantial turbulence in the slurry within the bowl 14.

As the slurry is deposited into the rotating bowl 14 it will undergo centrifugal acceleration to remove the filtrate from the wet particulate matter. Typically a sluury may contain ⅓ 500 to 150 micron particles, ⅓ 150 to 44 micron particles and ⅓ sub 44 micron particles. It is obviously necessary to provide egress for the filtrate while retaining the particulate matter within the bowl 14. To accomplish this separation, my invention uses a fine mesh screen filter media 21, perhaps with 100 to 120 micron openings, which overlies a pervious support structure 22 as is common in the art. The filter media 21, which in some cases may be non-metallic cloth or felt, must be capable of removing extremely fine particulate matter or "fines" and consequently is susceptible to a layer of such fines building up on the filter media 21 and blinding the filter media 21 such that incomplete drying or filtrate removal occurs. The filtrate, of course, is to pass through the filter media 21, pervious support 22 and exit the bowl 14 through a plurality of radial apertures 23. In the preferred embodiment, these apertures 23 form one or more bands of apertures about the center of the bowl 14. An annular recess 24 in the inner surface of the bowl 14 may coincide with the bands of apertures 23 and provides a retainer for the pervious support 22.

To prevent blinding of the filter media by the fines it is necessary to keep the fines away from the filter media 21 until a sufficient deposit of coarser material has formed a bed over the filter media 21. This bed would form a natural filter on which most of the fines would be deposited prior to reaching the filter media. While larger diameter particles will settle rather quickly in a fluid, particles of one micron to fifteen micron diameters, even with specific gravities of 2 or more, will remain in suspension for extended periods. Submicron size particles can remain in suspension for weeks. If enhanced gravity (by centrifuging) is encountered the settling rate is increased accordingly. However, if the slurry is agitated even under enhanced gravity the fine particles will remain in suspension for extended periods. Therefore, it is desired to keep the finest particulate in suspension until other phases of the filling process are nearly concluded. As hereinabove noted the nozzle assembly 17 plays a part in this procedure by maintaining the slurry in a turbulent state during filling so that the coarser particulate matter settles out of the suspension first. However, turbulent injection alone is insufficient to prevent the fines from reaching the filter media in the high gravity environment of a centrifuge. If the flow rate of filtrate through the orifices is too great the fines will remain suspended in the filtrate as it passes through the natural bed of coarser particulate matter and will blind the filter media. Accordingly, the flow rate of the filtrate must be conrolled. Thus, apertures 23 are actually metering orifices which restrict the flow of filtrate from the bowl 14, such that a pool of turbulent slurry is maintained inwardly of the material bed as the bowl 14 is filled at predetermined speeds of rotation of the bowl. By way of example for a 28-inch diameter bowl 14 being rotated at 1500 RPM it has been determined that a total orifice area of 10 sq. inch with 150 orifices, each with an area of 0.067 sq. inches distributed about the annular band of the bowl 14, adequately retards the extraction of the filtrate yet allows removal thereof at a commercially feasible rate.

It may be seen that the metering orifices thus retard the flow of filtrate and cause the liquid to remain in the bowl while additional slurry is injected from the nozzle thereby maintaining the level of slurry in a turbulent condition inside the filter media during loading of the slurry into the centrifuge.

It may also be advantageous to provide conical surfaces 26 on the inside of the bowl 14 to assist the filtrate in moving axially toward the filter media, however, it may also be determined that such surfaces are unnecessary.

While I have shown my invention in one form, it will be obvious to those skilled in the art that it is not so limited but is susceptible of various changes and modifications without departing from the spirit thereof.

What I claim is:

1. A centrifuge for extracting water from wet particulate matter introduced thereinto in the form of a slurry comprising:
   (a) a bowl having an opening at one end and mounted for driven rotation at the other end, said bowl having a plurality of radially opening metering orifices for the removal of water;
   (b) a fine screen filter media overlying said metering orifices on the interior of said bowl;
   (c) a pervious support means for supporting said filter media interposed between said filter media and said metering orifices; and
   (d) a nozzle for injecting said slurry into said bowl in a turbulent manner, with said nozzle and said metering orifices adapted to create and maintain turbulence in said slurry during loading of said slurry into said bowl.

2. The centrifuge of claim 1 wherein said fine screen filter media is a screen having a submicron size mesh.

3. The centrifuge of claim 1 wherein said metering orifices form one or more annular bands about said bowl.

4. The centrifuge of claim 3, further comprising an annular recess formed in the interior of said bowl for retention therein of said pervious support means, with said filter media forming a narrow band overlying said annular recess.

5. The centrifuge of claim 4 wherein the interior surface of said bowl is conic having a maximum inside diameter adjacent said filter and a minimum inside diameter at the ends of said bowl.

6. The centrifuge of claim 3 wherein the interior of said bowl has a maximum inside diameter adjacent said annular band and a minimum inside diameter at the ends of said bowl.

7. The centrifuge of claim 1, said nozzle extending axially within said bowl and having discharge ports for directing said slurry substantially radially into said bowl.

8. A method of extracting water from wet particulate matter introduced into a centrifuge in the form of a slurry, with said centrifuge having a fine screen filter media internally of the bowl thereof, comprising the steps of:
   (a) introducing said slurry into the rotating bowl of said centrifuge such that a turbulent condition is induced in said slurry as said bowl is being filled; and
   (b) restricting the flow rate of water removed from said wet particulate matter such that fine particulate material remains suspended in said slurry while coarser particulate material is deposited on or near said filter media.

9. The method of claim 8 wherein said restricting step comprises discharging said water radially from said bowl through a plurality of radial apertures sized to meter and control the rate of discharge at predetermined speeds of rotation of said bowl.

10. The method of claim 8 wherein said slurry is introduced into said bowl via a nozzle extending axially within said bowl said nozzle having discharge ports for directing said slurry substantially radially within said bowl.

11. The method of claim 8 wherein said bowl is rotated at approximately 1500 rpm during filling.

* * * * *